(12) United States Patent
Raguseo et al.

(10) Patent No.: US 7,840,461 B2
(45) Date of Patent: *Nov. 23, 2010

(54) METHOD, PROGRAM, AND SYSTEM FOR COMPUTING ACCOUNTING SAVINGS

(75) Inventors: Domenico Raguseo, Rome (IT); Gianluca Perilli, Sora (IT); Mario Somma, Rome (IT); Berardino Salvatore, Silvi Marina (IT)

(73) Assignee: International Business Machines Corporation, Armonk, NY (US)

( * ) Notice: Subject to any disclaimer, the term of this patent is extended or adjusted under 35 U.S.C. 154(b) by 1039 days.

This patent is subject to a terminal disclaimer.

(21) Appl. No.: 11/085,956

(22) Filed: Mar. 22, 2005

(65) Prior Publication Data

US 2006/0136312 A1 Jun. 22, 2006

(30) Foreign Application Priority Data

Dec. 17, 2004 (EP) .................................. 04300914

(51) Int. Cl.
*G06Q 40/00* (2006.01)
(52) U.S. Cl. ................................ 705/35; 705/1; 705/30
(58) Field of Classification Search .................... 705/1, 705/30, 35, 36 R, 10
See application file for complete search history.

(56) References Cited

U.S. PATENT DOCUMENTS

| | | | | |
|---|---|---|---|---|
| 6,338,149 B1 * | 1/2002 | Ciccone et al. | ............... | 714/38 |
| 7,315,826 B1 * | 1/2008 | Guheen et al. | ................. | 705/7 |
| 2001/0042036 A1 * | 11/2001 | Sanders | ........................ | 705/36 |
| 2002/0161688 A1 * | 10/2002 | Stewart et al. | ................ | 705/37 |
| 2003/0046203 A1 * | 3/2003 | Ichihari et al. | ................ | 705/35 |
| 2003/0088493 A1 * | 5/2003 | Larsen et al. | ................. | 705/36 |
| 2004/0078310 A1 * | 4/2004 | Shaffer | ........................ | 705/35 |
| 2004/0215533 A1 * | 10/2004 | Doeberl et al. | ................ | 705/30 |
| 2005/0080696 A1 * | 4/2005 | Bagchi et al. | ................. | 705/35 |
| 2005/0144106 A1 * | 6/2005 | Eder | ........................... | 705/36 |
| 2005/0154654 A1 * | 7/2005 | Berstis et al. | ................. | 705/30 |
| 2006/0241949 A1 * | 10/2006 | Tobias et al. | .................. | 705/1 |

OTHER PUBLICATIONS

IOMA's Report on Financial Analysis, Planning & Reporting: "How Corporate Plans for Growth Will Be Financed",. New York, May 2004. vol. 04, Iss. 5; p. 1, 4 pgs.*

* cited by examiner

*Primary Examiner*—Narayanswamy Subramanian
*Assistant Examiner*—Ed Baird
(74) *Attorney, Agent, or Firm*—Steven L. Nichols; Vancott, Bagley, Cornwall & McCarthy PC

(57) ABSTRACT

Method, system, and computer program product for computing accounting savings for a business related investment of a target product. The target product and at least one currently used product have at least one feature, and the business comprises at least one business related activity. The method comprises reading, from a database, business activities, target and current product features, their relation, and predetermined values of savings obtained by the features of the products on an activity. The difference of savings between the target and current product per activity is computed. During the process the read data are displayed to the user, who can then modulate the values or add new ones.

14 Claims, 5 Drawing Sheets

METHOD, PROGRAM, AND SYSTEM FOR COMPUTING ACCOUNTING SAVINGS

FIELD OF THE INVENTION

The present invention generally relates to computer aided methods and systems for accounting associated with investments in information technologies (IT), new business-to-business (B2B) processes, corporate mergers, acquisitions, and the like.

BACKGROUND

Corporate managers need tools to help them make decisions regarding investments. Decisions about the costs of IT management may be of special concern, as the field of IT management may lie outside the immediate experience of those making the decisions, and yet IT may be essential to running the decision makers' businesses. Managing costs effectively often means investing only when a favorable return on an investment is evident and tangible. This may be problematic, since savings in general are intangible; thus, it is difficult for IT management to decide whether it makes sense or not to invest in a technology, process, tool, or solution.

There is a need to be able to answer questions such as: What will the savings be with this product or feature? What task or activity needs to be done better to increase savings? What process needs to improve?

Computer aided return-on-investment (ROI) sales tools that exist today, such as the methods and systems described in pending US patent application 20040010459, do not differentiate between tangible and intangible savings. This kind of solution, which includes efficient computing means, may provide vaguely intangible benefits and unrealistically large estimates of savings. Also, these tools cannot adapt to changes in business requirements, as surveys are transformed into datasets that cannot be changed. Finally, these solutions may not support practical business modeling actions that optimize the use of the investment.

The "IT Infrastructure Library" (ITIL) provides best practices in the area of service management. It contains specialist documentation on the planning, provisioning, and support of IT services. ITIL provides the basis for improvement of the use and effectiveness of an operationally deployed IT infrastructure. Consultancies can be provided to understand how a process can be improved with ITIL. Unfortunately, the result focuses on identifying which processes need to be improved and how, rather than identifying and quantifying the resulting savings.

Finally, other tools such as the Automation Assessment Tool of IBM Tivoli (Tivoli is a trademark of International Business Machines Corporation in certain countries) help provide an understanding of an organization's current automation capabilities and map key focus areas to enhance these capabilities. The tool measures the level of automation function against each of six functional areas within an IT environment and alerts management as to which processes need to be authorized, but does not provide information on savings.

There is thus a need for an easy to use and efficient computer aided tool for evaluating the tangible savings that can be expected from a business investment.

SUMMARY

It is therefore an object of the present invention to provide a computer aided method and system for evaluating savings available thorough an investment.

An aspect of the invention is a computer aided method for computing and displaying accounting savings for a business related investment of a target product, where the target product and at least one current product used in the business have at least one feature, and the business includes at least one business related activity. The method includes: reading at least one feature for each product and at least one business related activity; entering the target product; identifying feature-activity pairs related to the target product and the current product among predetermined feature-activity pairs associated with products; reading and summing predetermined values of the savings associated with each identified feature-activity pair related to the target product; reading and subtracting from the sum obtained in the preceding step predetermined values of the savings associated with each identified feature-activity pair related to the target product; and providing the computed value of savings to the user through the user interface.

An advantage of the method and system of the invention is the ability the user has to improve the results by changing inputs and performing new cost saving computations.

The inventive method and system may be used to support sales before an investment at a customer site company, and may also be used over time to calculate savings as the investment variables change depending on different business requirements. For example, consider the case of IT variables. In this example, IT variables may be software products or frameworks, hardware, head count, and the like. The possibility to react quickly to changes without the need to rewire the tool makes the tool valuable for rapid business impact management. Using the tool in a predictive manner gives insight into how savings may change in response to changing any of the IT variables. This may be extended to measure the savings associated with B2B processes, and even to acquisitions, mergers, and the like.

DETAILED DESCRIPTION

Figure 1:
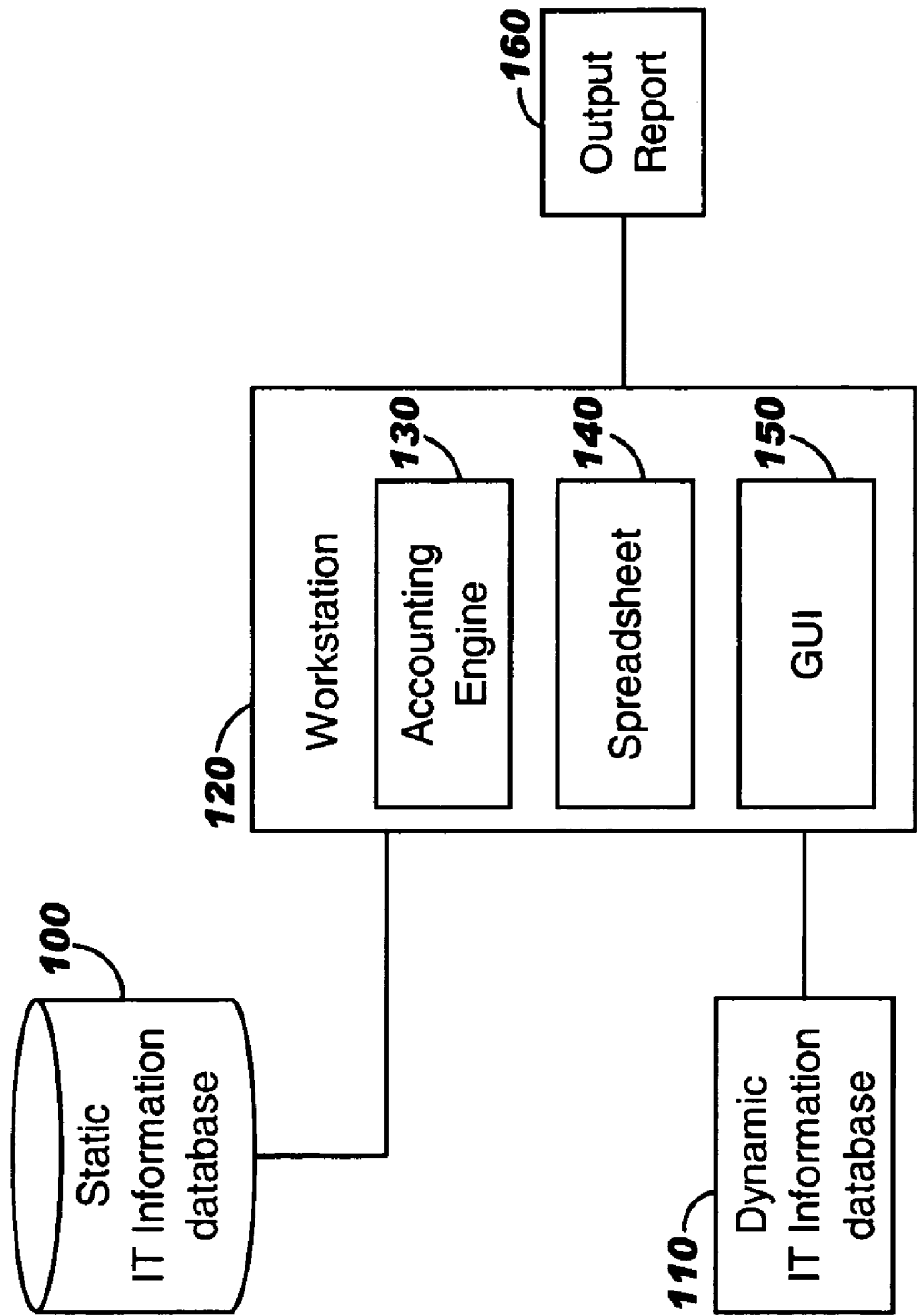
FIG. 1 is an overview of a computing environment in the context of the invention.

FIG. 1 is an overview of a computing environment suitable for a preferred embodiment of the invention that computes savings for IT investments. A management representative could be the user of the method, which is generally run at the company site IT service building, although the invention is not so limited. The user starts an accounting session on a workstation (120) on which the accounting engine (130) operates. The accounting engine is the program implementing the computing of savings. In a preferred embodiment, the accounting engine may use a spreadsheet program (140) such as Lotus 123 (Lotus 123 is a trademark of International Business Machines Corporation). The spreadsheet program itself may have a graphical user interface (GUI 150) as usually made available with the operating system of the workstation. Any other GUI may be used as well.

IT management information, which can be stored in a data warehouse for large installations having tools for managing IT, may serve as the input to the method of this illustrative embodiment. This data may be inserted manually during the accounting session, or, preferably, may be retrieved automatically from a database populated by an IT management tool. The company management IT information may include, for example, static information such as organizational information (employees, their salaries, and so forth) or IT management information such as the IT asset inventory (number of workstations, network description, software product version release, software product functions, and so forth). This information may be included in the so called static IT information database (100). The inputs may also include data regarding present IT costs and the activities that customers are performing. These data may address, for example, the cost of headcount, the number of servers, the number of workstations, the time required to provide a distribution analysis, and so forth. Other IT information used as inputs by the accounting session may change more frequently, such as the size of code packages distributed on the network, the number of repair actions on hardware parts or user software components, the usage pattern of software products, and so forth. Such information may be periodically logged in the dynamic IT information database (110). The accounting engine may also collect inputs from the user during the accounting session through the graphical user interface, and communicate results to the user in the form of, for example, displayed spreadsheets or printed reports (160). For each investment operation, the printed or displayed output may give costs and cost breakdowns for the different IT products, features, activities, tasks, and processes, this giving the user a clear idea about the nature of the savings.

After running an accounting session to compute the savings, someone using the method may modify the input IT data and rerun the accounting session as many times as desired. This can help the user anticipate what the savings would be in various circumstances. The first run provides saving outputs based on the current IT variables representing the current customer IT environment, and are read as inputs (100, 110). A user who would like to increase savings may then take corrective actions which affect the IT variables. Also, the user may modify any manually entered input variables to investigate the effects of strategies such as moving headcount from one department to another. After corrective actions are taken and manually entered input variables are modified, a second run gives insight into the savings.

Figure 2:
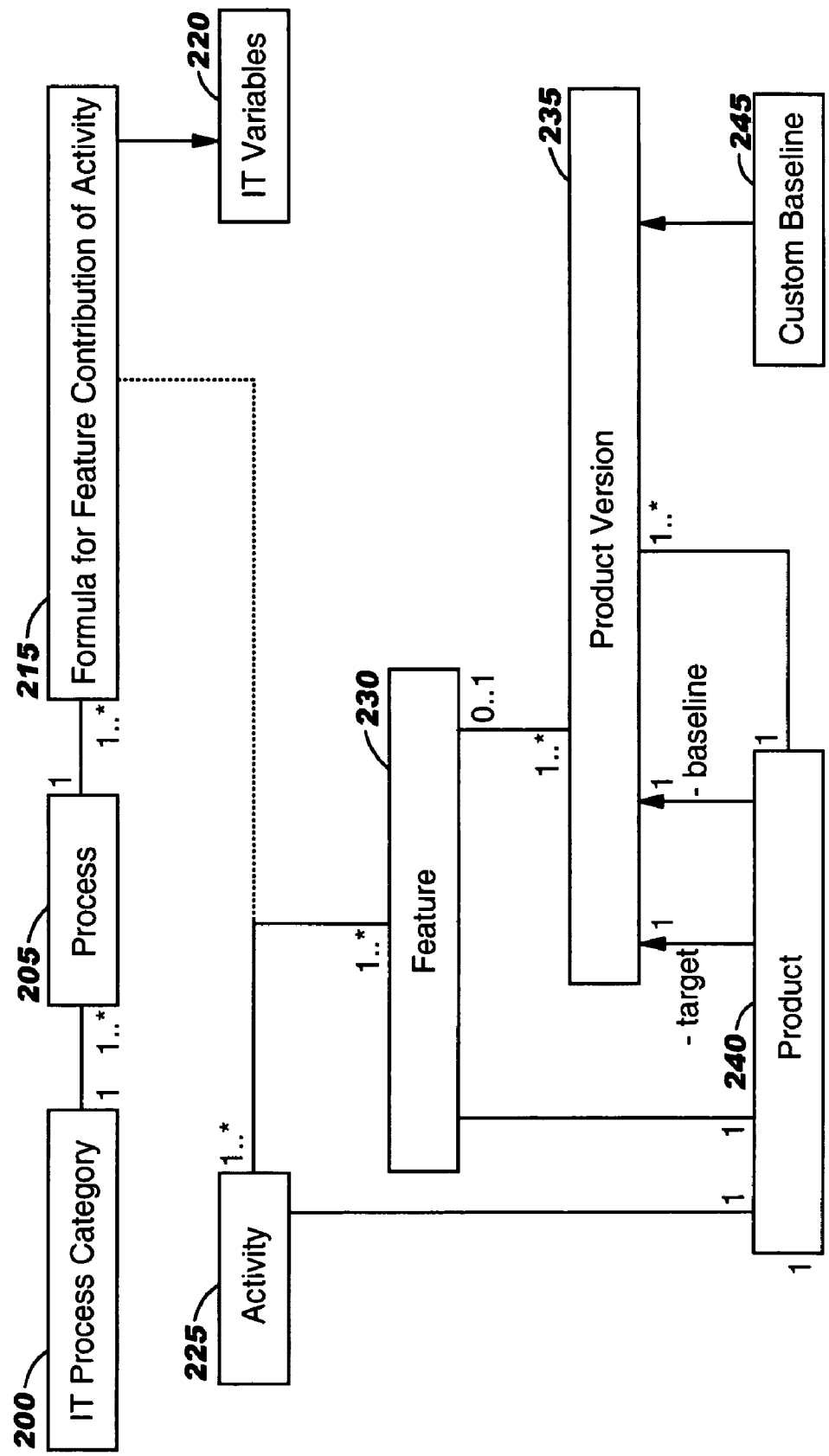
FIG. 2 illustrates a data model which supports the inventive method.

FIG. 2 depicts an exemplary data model supporting the inventive method. In this model, expressed here in UML notation, IT processes are grouped into IT process categories. Each process can be associated uniquely with an IT process category. This relationship is described in the top left part of FIG. 2 by the line that connects the 'IT process category' class (200) with the 'process' class (205). The label '1' near the 'IT process category' box means that the 'IT process category' class participates in the relationship with a multiplicity of 1. Analogously, the label '1..*' near the 'process' box means that the 'process' class participates in the relationship with a multiplicity of at least one. The label '0..1' near the feature class box means that a feature can be associated with at most one product version. The lower part of FIG. 2 shows the product class (240), which represents a software product that implements some specific IT activities such as, for example, the installation of a software package as, or performed by, a software distribution product. These tasks are represented in the diagram by the 'activity' class (225). The mapping between products and activities is one-to-one.

From another point a view, a software product can be seen as a list of elementary features. An example of such a feature might be a compression algorithm that reduces the amount of network traffic generated by a software distribution product. This concept is captured by the 'feature' class (230) and by the relationship between 'product' and 'feature.' For each possible crossing between activities and features belonging to a product, a formula can be written that expresses the contribution of the feature to the activity (for example, expressed in thousands of dollars, per day, of savings). This is represented in FIG. 2 by the 'formula for feature contribution of activity' association class (215).

The formula depends in general on a set of predefined or custom IT variables that the user can provide manually or automatically from an external process. The 'IT variables' class (220) represents this data. The 'product version' class (235) is associated with 'product,' and defines a subset of the product's features, as expressed by the relationship 'Product Version'–'Feature.' The rationale behind this is that a product in general evolves by adding new features and by substituting more advanced features for less advanced features. Thus, a given product version of a product may be associated with some features. The next version may be associated with some of the old features and with some new features, and may eliminate some of the old features.

This leads to the concepts of baseline and target levels. If one wants to evaluate the savings associated with a software upgrade from a certain version of a product, i.e., the baseline, to another version or product, i.e., the target, a computation is done over the sum of the savings associated with the target's features minus the sum of the savings associated with the baseline's features. For the features that are present in both baseline and target, the contribution to the total savings will be null. For the features that are present in the baseline but are not present in the target, the contribution to the saving will be negative. The concepts of baseline and target are expressed in FIG. 2 by the dotted associations between 'Product' and 'Product Version'. A custom baseline may also be defined, where the user can select a list of features to use as a baseline or a target level. This concept is expressed in FIG. 2 by the 'custom baseline' class (245) that may be logically considered as a particular type of a 'product version' (a subclass UML relationship).

Figure 3:
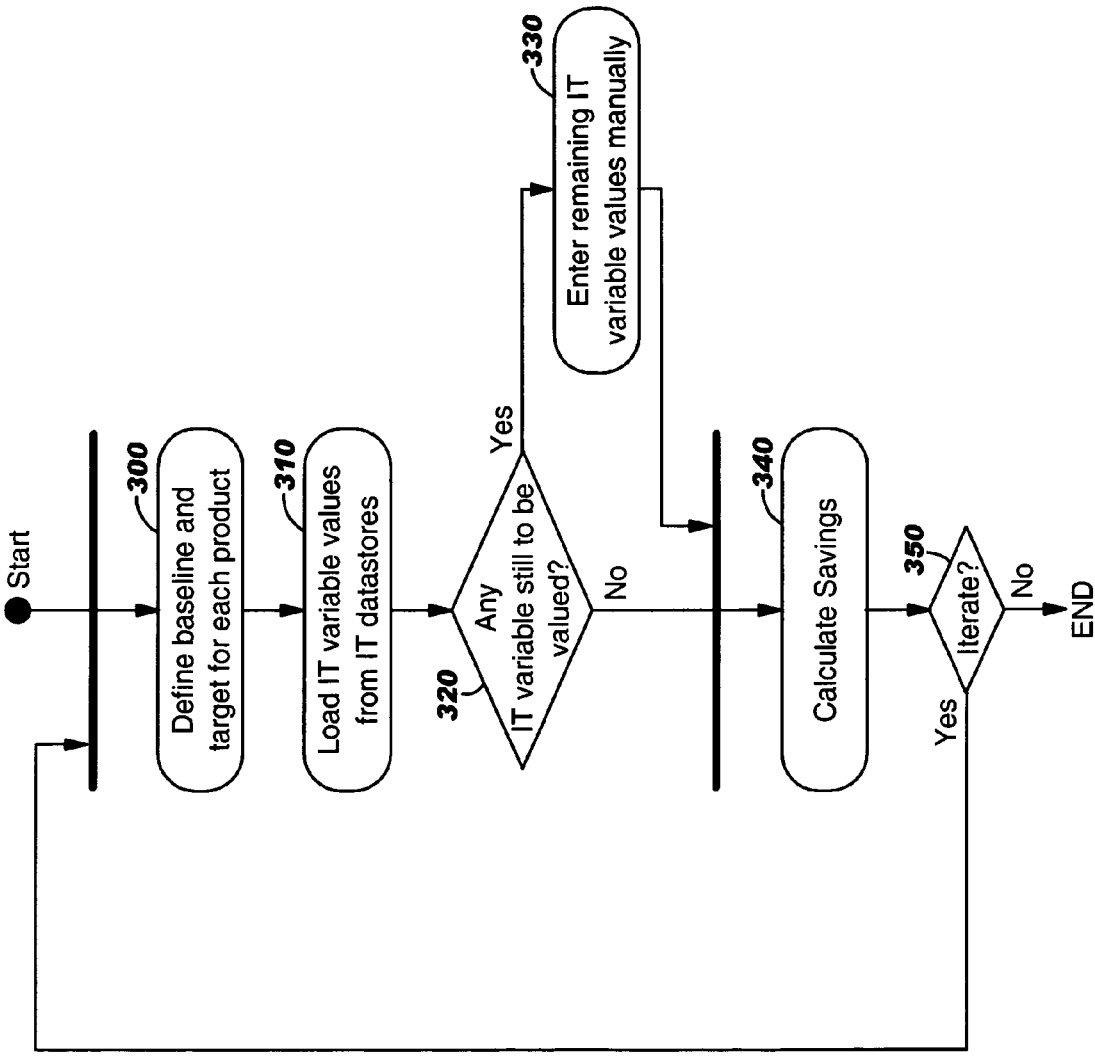
FIG. 3 is a flowchart illustrating aspects of the inventive method.

FIG. 3 shows an exemplary flowchart wherein the inventive method is applied to calculate savings attributable to IT data that represents a software product. The choice of a software product here is only for clarity of discussion; the inventive method applies to other kinds of IT input data as well. The tool is normally configured at development time. To configure the tool, the data described in the previous section is defined, except for the value of IT variable that are instead provided during the production phase. The test tool and the data (formulas, features, product versions, etc.) may be provided by product vendors.

Baseline and target levels are defined for each software product (step 300). This step is detailed below with reference to FIG. 4. The accounting engine is then provided with the production IT data needed by the formulas defined therein (step 310). This task may be done ideally in two steps: an automatic step wherein the IT data that is available from external systems (100, 110) is input to the tool via an API, and then an optional manual step wherein the remaining needed IT data is input manually (step 330) through the GUI and loop with test (step 320). The IT data entered via the automatic step can be modified as well by the user during the step of manually entering IT data (step 330). After all the data is input, the tool calculates the savings (step 340), as described below with reference to FIG. 4. The output may be in various electronic formats and/or through the GUI. At this point, the whole process can be reiterated (answer Yes to the test at step 450) as needed.

Figure 4:
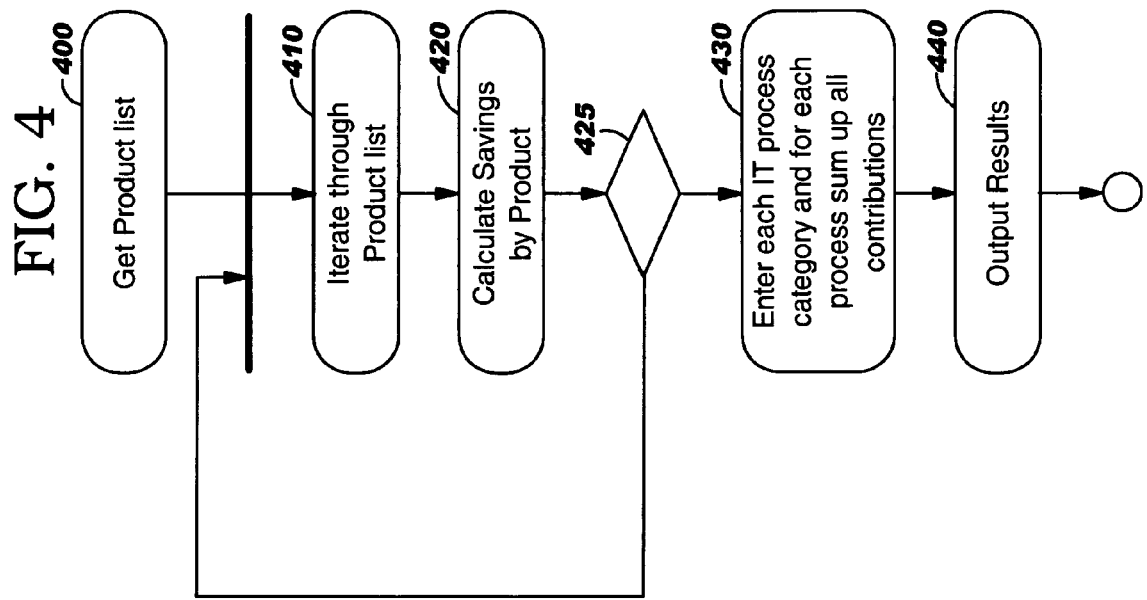
FIG. 4 is a flowchart showing how savings may be calculated in the method of FIG. 3.

The diagram in FIG. 4 further describes the 'calculate savings' subflow (step 340) shown in FIG. 3, here applied to IT data that represents a software product. As shown in FIG. 4, the list of products is retrieved from the database (step 400), and an iteration over the product list begins (step 410). Savings per product are calculated for the current product (step 420), as described below with reference to FIG. 5. The contributions are then summed for each IT process category and for each process (step 430).

Figure 5:
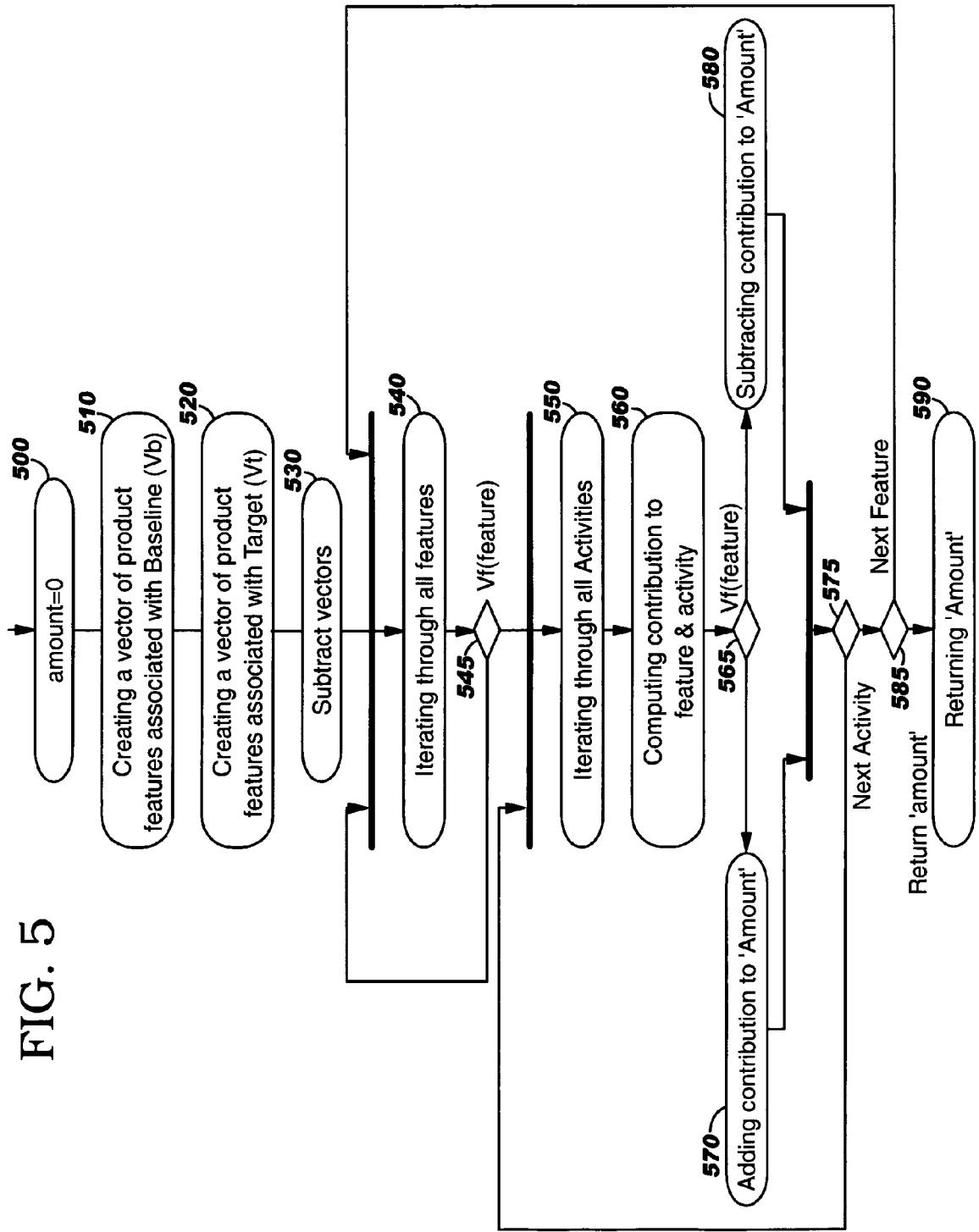
FIG. 5 is a flowchart showing how a baseline and target may be defined for each product in the context of the method of FIG. 3.

FIG. 5 illustrates aspects of defining a baseline and target for each product (step 420 of FIG. 4) as applied to IT data that represents a software product. This flow may begin by setting a variable called 'amount' to zero. A vector 'Vb' of product features associated with the baseline is created (step 510). This vector contains either '1' or '0' depending on whether the corresponding product feature is present or not in the product version associated with the baseline. A similar vector 'Vt' is created, this time referring to the target product version (step 520). The vector difference (Vf=Vt−Vb) is calculated (step 530). Iteration over the set of all product features then begins (step 540), and the value of Vf at the position given by the current value of the iteration index is found (step 545). If the value of the iteration index is zero, the iteration continues.

Otherwise (i.e., the value of the iteration index is not zero), a nested iteration over all the activity set begins (step 550). The contribution given by the current feature to the current activity is computed (step 560). A determination is made as to whether the value of Vf at the position given by the current value of the iteration index is −1 or +1 (step 565). If the current value of the iteration index is −1, the contribution (calculated in step 560) is added to the variable 'amount' (step 570); otherwise, the contribution is subtracted from the variable 'amount' (step 580). If any activity remains unexamined, the iteration continues to the next activity (step 575 returns to step 550). Otherwise, if any feature remains unexamined, the iteration continues to the next feature (step 585 returns to step 540). Otherwise (i.e., all activities and features have been examined), the value of the variable 'amount' is reported.

The output then represents savings measured against the baseline. In the output, the total saving may be split by IT process in a global output. Each single process may have a breakdown by activity in a detailed output. For example, savings may be expressed in thousands of dollars per day for configuration management, incident management, problem management, change management, release management, service level management, availability management, capacity management, IT service continuity management, and financial management of IT services. Also, the savings may be output for, for example, the problem management IT process split into three sub-processes, which may be problem management itself, known error control, and proactive error management. Further, the savings may be output for, for example, the known error control sub process, split into four activities: error identification and recording, error assessment, record error resolution, and close error and associated problems.

In a preferred embodiment, the inventive method and system may be implemented using a spreadsheet program where input and output may be visualized on sheets. The global output can be the object of one sheet, and the detailed output the object of other sheets. The spreadsheet may provide a framework out of a possible set of different frameworks.

For example, the method may be executed by an application server or as a standalone process. In the case of an application server, the user could connect to a service to compute the cost savings. Here, the same server might also provide IT management service and maintain a database having static and dynamic IT information. The service would be to operate the accounting savings engine on the server. The user could connect remotely to this service through the Internet. The user in this case could receive web pages suitable for entering information or for reading information coming from the application server, which could be a Web server. Before operating the accounting saving computation, the user would open a session and enter his or her identification. The Web server could verify, using subscription tables it maintains, that the user is authorized to access this service, based on the payment of a subscription fee.

Modules corresponding to products may be installed on top of the spreadsheet framework. Data associated with new products can easily be added to the system because of the flexible data model.

The framework may comprise a sheet for visualizing the information read as inputs from the IT management database. The user may update this information in the sheet. For example, a line for each program product may be displayed with the baseline and target version for each in columns. A user can perform predictive accounting saving computations by modifying the contents of the sheets. For example, the database may indicate that the baseline of a product is software version 1.2, and the target is version 1.3. This information may be displayed in the sheet with all the input IT data. In one run of the method, the user can compute cost using the inputs read from the database. In a subsequent run, the user may decide to change the target from version 1.3 to version 4. Target version 4 may include more functionality, but might have different costs and savings.

The line for each program product displayed on the input IT data sheet may include, in addition to the baseline and target version columns, product feature columns indicating whether the features are present or not depending on the versions (indicated as 1 if present, 0 if not present in the columns of the product lines). Once again, the user can modify this information and indicate whether a feature will actually be used regardless of the version of the installed product. The user can also add new columns with new features.

Additional rows represent the activities. Savings may be indicated per each feature-activity pair by the computer according to a given formula. Optionally, the customer may introduce, in the input IT data sheet, percentages of credibility that modulate or modify the savings resulting from the use of a given feature on a given activity. For instance, if the products concerned a network, the user could moderate the savings presented by adopting a particular kind of telecommunication line by taking only 70% of the full potential savings, because he or she might know that the price charged by a preferred vendor is often above the prevailing market price. In another example, the user might moderate savings because he or she knows from past experience that a certain feature cannot be used effectively at the site in question.

We claim:

1. A computer aided method for computing accounting savings for a business related investment of one target product, said target product and at least one current product used in the business having at least one feature, the business comprising at least one business related activity, said method comprising:
   identifying for each of the at least one current product and the target product the at least one feature with accounting engine software executed by a computer;

identifying the at least one business related activity with said accounting engine software executed by said computer;

identifying, with said accounting engine software executed by said computer, for each feature present in at least one of the target product and the at least one current product, a predetermined value of savings associated with the feature for the at least one business related activity;

summing, with said accounting engine software executed by said computer, the identified predetermined values of savings associated with each feature present in the target product that is not present in the at least one current product to obtain a sum;

subtracting from the obtained sum the identified predetermined values of savings associated with each feature present in the current product that is not present in the target product to compute a total value of savings associated with the target product using said accounting engine software executed by said computer; and providing the computed total value of savings associated with the target product to a user with said accounting engine software executed by said computer.

2. The method of claim 1, further comprising:

providing to the user the identified predetermined values of the savings associated with each identified feature present in at least one of the target product and the current product;

receiving a modification by the user of at least one of the identified predetermined values of savings;

calculating the total value of savings associated with said target product based on the modification by the user; and providing the computed value of savings to the user.

3. The method of claim 2, wherein the modification performed by the user includes entering a percentage modulating a savings value.

4. The method of claim 3, further comprising:

identifying at least one new feature provided by the user through a user interface;

identifying at least one new business related activity provided by the user through the user interface; and recalculating the total value of savings associated with the target product based on the at least one new feature and the at least one new business-related activity provided by the user.

5. The method of claim 4, further comprising providing to the user the computed total value of savings associated with the target product detailed per activity.

6. The method of claim 5, further comprising:

creating a vector of features for each activity associated with the target product and a vector of features for each activity associated with the current product, each vector comprising a plurality of coordinates, wherein each coordinate corresponds to a particular feature and has a value of 1 if the feature is associated with the product represented by the vector and 0 if the feature is not associated with the product represented by the vector;

performing a vector subtraction of the vector associated with the current product from the vector associated with the target product to obtain a difference vector, each coordinate in the resulting difference vector having a value of 0, 1 or −1;

identifying predetermined savings values associated with each feature represented by a coordinate of the difference vector for each activity;

for each activity, determining a total savings associated with the target product by subtracting the predetermined savings values for the activity associated with each feature represented by a coordinate with a value of −1 in the difference vector from a sum of the predetermined saving values for the activity associated with each feature represented by a coordinate with a value of 1 in the difference vector; and providing to the user the total savings associated with the target product per activity.

7. The method of claim 6, wherein the user interface comprises a spreadsheet that uses a graphical user interface of the computer.

8. A computer program product for computing accounting savings for a business related investment of one target product, said target product and at least one current product used in the business having at least one feature, the business comprising at least one business related activity, said computer program product comprising a computer readable storage medium having computer readable program code embedded therein, the computer readable program code comprising:

computer readable program code configured to identify for each of the at least one current product and the target product the at least one feature;

computer readable program code configured to identify the at least one business related activity;

computer readable program code configured to identify, for each feature present in at least one of the target product and the at least one current product, a predetermined value of savings associated with the feature for the at least one business related activity;

computer readable program code configured to sum the identified predetermined values of savings associated with each feature present in the target product that is not present in the at least one current product to obtain a sum;

computer readable program code configured to subtract from the obtained sum the identified predetermined values of the savings associated with each feature present in the at least one current product that is not present in the target product to compute a total value of savings associated with the target product; and computer readable program code configured to provide the computed total value of savings associated with the target product to the user.

9. The computer program product of claim 8, further comprising:

computer readable program code configured to provide to the user the identified predetermined values of the savings associated with each identified feature present in at least one of the target product and the current product;

computer readable program code configured to receive a modification by the user of at least one of the predetermined values of savings;

computer readable program code configured to calculate the total value of savings associated with the target product based on the modification by the user; and computer readable program code configured to provide the computed value of savings to the user.

10. The computer program product of claim 9, wherein the modification performed by the user includes entering a percentage modulating a savings value.

11. The computer program product of claim 10, further comprising:

computer readable program code configured to identify at least one new feature provided by the user through a user interface;

computer readable program code configured to identify at least one new business related activity provided by the user through the user interface; and computer readable program code configured to recalculate the total value of savings associated with the target product based on the at least one new feature and the at least one new business-related activity provided by the user.

12. The computer program product of claim 11, further comprising computer readable program code configured to provide to the user the computed total value of savings associated with the target product detailed per activity.

13. The computer program product of claim 12, further comprising:

computer readable program code configured to create a vector of features for each activity associated with the target product and a vector of features for each activity associated with the current product, each vector comprising a plurality of coordinates, wherein each coordinate corresponds to a particular feature and has a value of 1 if the feature is associated with the product represented by the vector and 0 if the feature is not associated with the product represented by the vector;

computer readable program code configured to perform a vector subtraction of the vector associated with the current product from the vector associated with the target product to obtain a difference vector, each coordinate in the resulting difference vector having a value of 0, 1 or −1;

computer readable program code configured to identify predetermined savings values associated with each feature represented by a coordinate of the difference vector for each activity;

computer readable program code configured to, for each activity, determine a total savings associated with the target product by subtracting the predetermined savings values for the activity associated with each feature represented by a coordinate with a value of −1 in the difference vector from a sum of the predetermined saving values for the activity associated with each feature represented by a coordinate with a value of 1 in the difference vector; and computer readable program code configured to provide to the user the total savings associated with the target product per activity.

14. The computer program product of claim 13, wherein the user interface includes computer readable program code comprising a spreadsheet that uses the services of a graphical user interface of a computer.

* * * * *